US011187890B2

(12) United States Patent
Fujishima et al.

(10) Patent No.: US 11,187,890 B2
(45) Date of Patent: Nov. 30, 2021

(54) MOVABLE DIFFRACTION ELEMENT AND SPECTROSCOPE

(71) Applicant: Ricoh Company, Ltd., Tokyo (JP)

(72) Inventors: Masayuki Fujishima, Kanagawa (JP); Hidetaka Noguchi, Hyogo (JP); Hidenori Kato, Hyogo (JP); Masashi Suematsu, Hyogo (JP); Junichi Azumi, Miyagi (JP); Shuichi Suzuki, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 96 days.

(21) Appl. No.: 15/915,094

(22) Filed: Mar. 8, 2018

(65) Prior Publication Data
US 2018/0267293 A1  Sep. 20, 2018

(30) Foreign Application Priority Data

Mar. 15, 2017 (JP) .............................. JP2017-050629

(51) Int. Cl.
*G02B 26/08* (2006.01)
*G01J 3/18* (2006.01)
*G02B 26/00* (2006.01)

(52) U.S. Cl.
CPC ............ *G02B 26/0808* (2013.01); *G01J 3/18* (2013.01); *G02B 26/007* (2013.01); *G02B 26/0858* (2013.01); *G02B 26/0866* (2013.01)

(58) Field of Classification Search
CPC ............ G02B 26/0808; G02B 26/0816; G02B 26/0833; G02B 26/0858; G02B 26/0866; G02B 26/106; G02B 5/18; G02B 5/1828; G02B 5/1861; G02B 27/0944; G01J 3/18; G01J 2003/1814; G01J 2003/1847
(Continued)

(56) References Cited

U.S. PATENT DOCUMENTS 5,905,571 A    5/1999  Butler et al.
6,977,765 B1  12/2005  Yeo
(Continued)

FOREIGN PATENT DOCUMENTS

CN    103091835 A    5/2013
JP    2005-172626 A   6/2005
(Continued)

OTHER PUBLICATIONS

Extended European Search Report dated Jul. 17, 2018 in Patent Application No. 18159542.2, 11 pages.
(Continued)

*Primary Examiner* — Marin Pichler
(74) *Attorney, Agent, or Firm* — Xsensus LLP (57) ABSTRACT

A movable diffraction element and a spectroscope. The movable diffraction element includes a movable component having a comb-like shape, a supporting unit configured to support the movable component, a first cantilever actuator coupled to the supporting unit, a displacement determiner coupled to an edge of the first cantilever actuator, and a second cantilever actuator disposed parallel to the first cantilever actuator. In the movable diffraction element, a slope generated when the second cantilever actuator deforms is approximately equivalent to a slope generated at the first cantilever actuator. The spectroscope includes the movable diffraction element.

11 Claims, 9 Drawing Sheets

(58) Field of Classification Search
USPC ......... 359/198.1–199.4, 200.6–200.8, 202.1, 359/221.2, 223.1–225.1, 226.2, 904, 359/290–295, 838, 846, 871
See application file for complete search history.

(56) References Cited

U.S. PATENT DOCUMENTS

| | | |
|---|---|---|
| 2004/0218877 A1 | 11/2004 | Xie |
| 2005/0140987 A1 | 6/2005 | Xie |
| 2009/0262346 A1* | 10/2009 | Egloff .................. G01J 3/02 356/326 |
| 2010/0307150 A1 | 12/2010 | Wu et al. |
| 2017/0233244 A1 | 8/2017 | Chen et al. |
| 2017/0350759 A1 | 12/2017 | Azumi et al. |

FOREIGN PATENT DOCUMENTS

| | | |
|---|---|---|
| JP | 2005-195721 | 7/2005 |
| JP | 2010-148265 A | 7/2010 |
| JP | 2011-501211 A | 1/2011 |
| JP | 2016-133658 A | 7/2016 |
| WO | WO1996/041217 A1 | 12/1996 |
| WO | WO2006/057881 A1 | 6/2006 |
| WO | WO 2016/065887 A1 | 5/2016 |

OTHER PUBLICATIONS

Office Action dated Aug. 17, 2021 in Japanese Patent Application No. 2017-050629, 1 page.

\* cited by examiner

MOVABLE DIFFRACTION ELEMENT AND SPECTROSCOPE

CROSS-REFERENCE TO RELATED APPLICATION

This patent application is based on and claims priority pursuant to 35 U.S.C. § 119(a) to Japanese Patent Application No. 2017-050629, filed on Mar. 15, 2017, in the Japan Patent Office, the entire disclosure of which is hereby incorporated by reference herein.

BACKGROUND

Technical Field

Embodiments of the present disclosure relate to a movable diffraction element and a spectroscope.

Background Art

In image display apparatuses, typified by projectors, a method of generating two-dimensional images of the light emitted from a light source such as a grating light valve (GLV), using an optical scanner such as a rotating mirror, is known in the art. In the GLV structure, a plurality of strip-shaped movable components are one-dimensionally arranged, and voltage is applied across the movable components and a substrate that is opposite those movable components. Accordingly, the movable components are displaced towards the substrate. Such an element is referred to as a micro-electromechanical systems (MEMS) ribbon element, and by displacing a portion of the element, one-dimensionally arranged element serves as a diffraction element, and the diffracted light can be modulated. Movable diffraction elements are known in the art in which multiple diffraction elements are separated into two groups to implement a light modulator that can operate independently or in combination with other modulators. Moreover, the known movable diffraction element is provided with means for changing the height of each of the two groups of diffraction elements independently.

SUMMARY

Embodiments of the present disclosure described herein provide a movable diffraction element and a spectroscope. The movable diffraction element includes a movable component having a comb-like shape, a supporting unit configured to support the movable component, a first cantilever actuator coupled to the supporting unit, a displacement determiner coupled to an edge of the first cantilever actuator, and a second cantilever actuator disposed parallel to the first cantilever actuator. In the movable diffraction element, a slope generated when the second cantilever actuator deforms is approximately equivalent to a slope generated at the first cantilever actuator. The spectroscope includes the movable diffraction element.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Some embodiments of the present disclosure are described below with reference to the drawings. In the description of the embodiments, like reference signs are given to elements having similar functionality or configuration, and overlapping description may be omitted where appropriate. The drawings may be simplified or partially omitted to aid the understanding of a particular configuration.

First Embodiment

Firstly, a configuration of the movable diffraction element 1 according to a first embodiment of the present disclosure is described with reference to FIG. 1 to FIG. 4.

Figure 1:
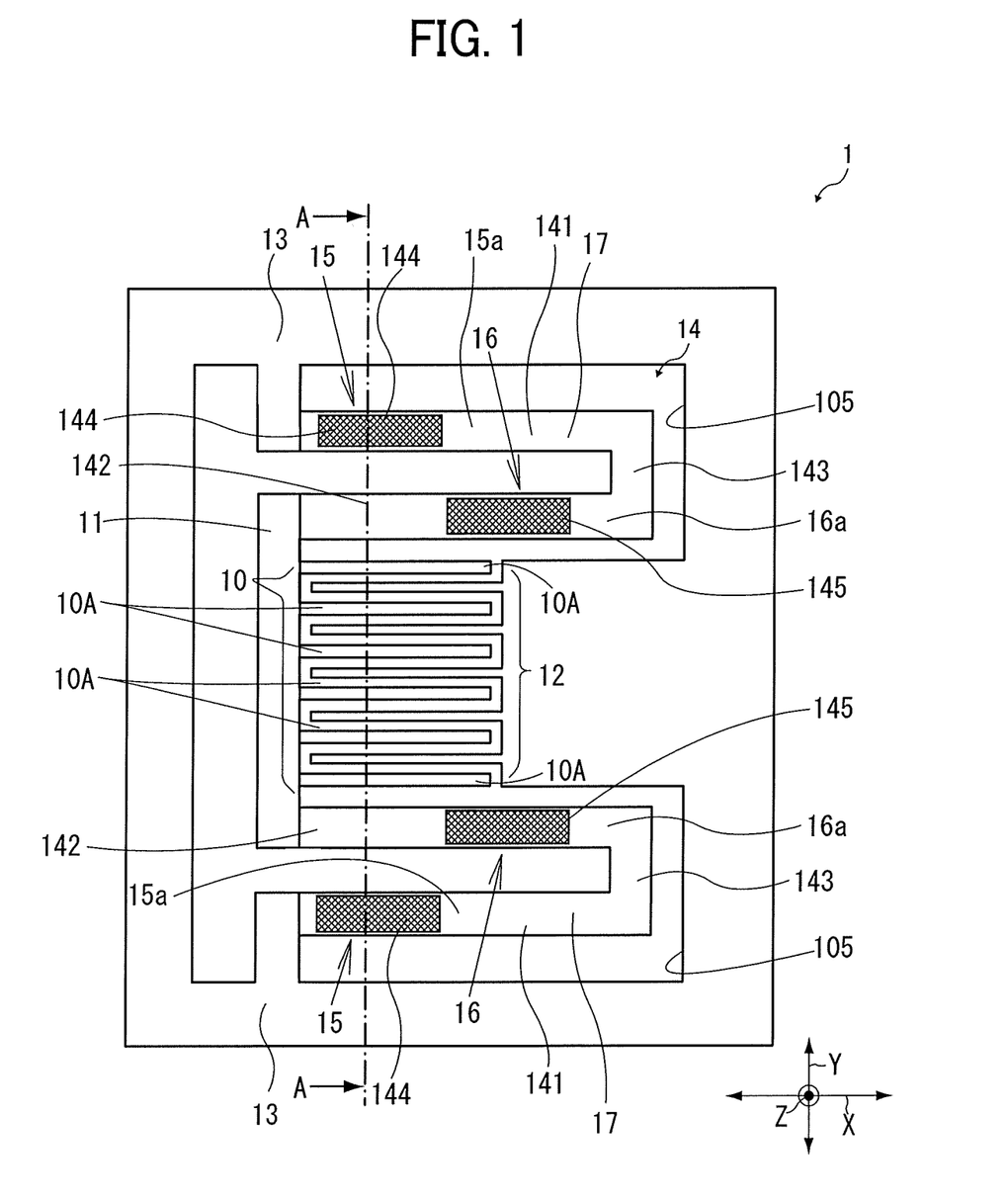
FIG. 1 is a diagram illustrating a configuration of a movable diffraction element according to a first embodiment of the present disclosure.

FIG. 1 is a plan view of a configuration of the movable diffraction element 1 according to the present embodiment.

Figure 2:
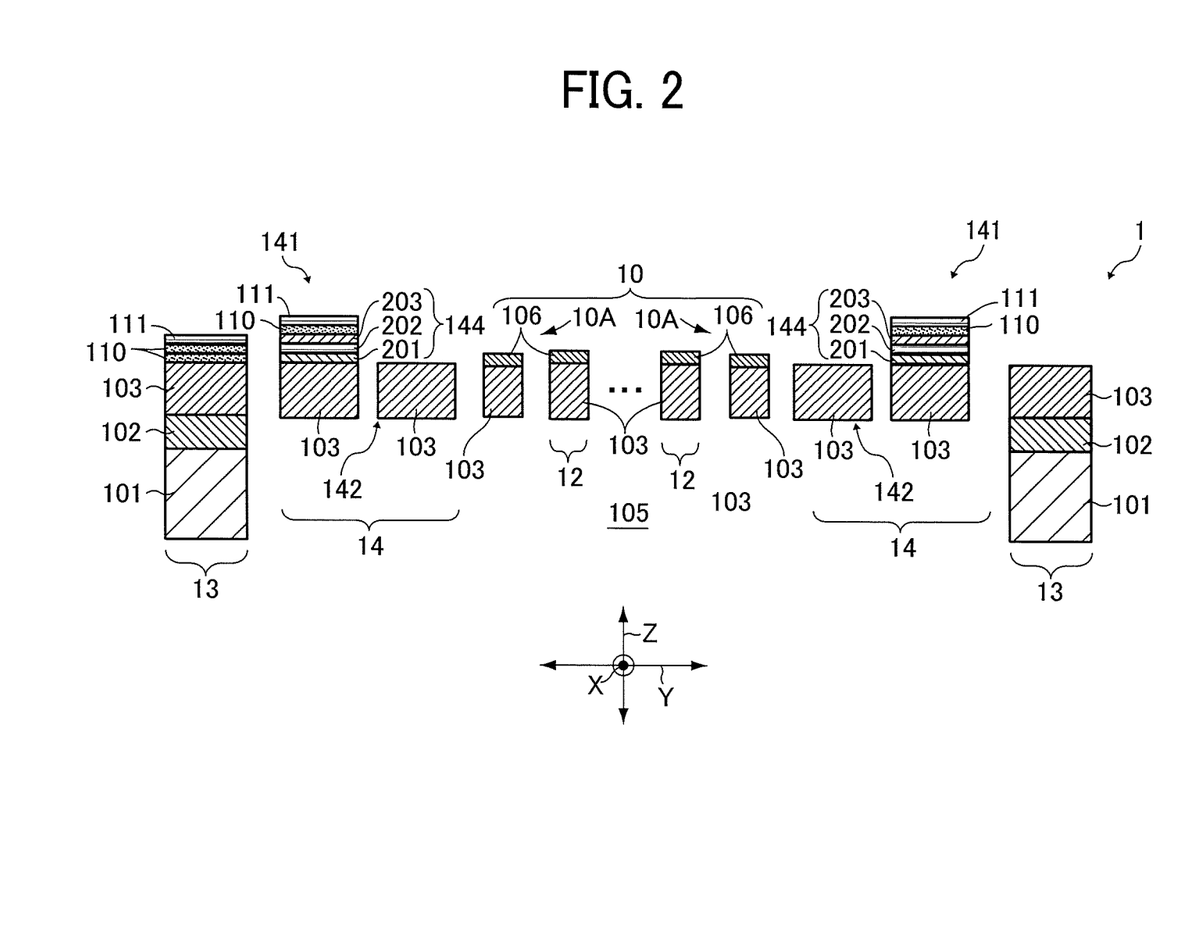
FIG. 2 is a cross-sectional view of A-A line indicated in FIG. 1.

FIG. 2 is a A-A line sectional view of the movable diffraction element 1 illustrated in FIG. 1.

Figure 3:
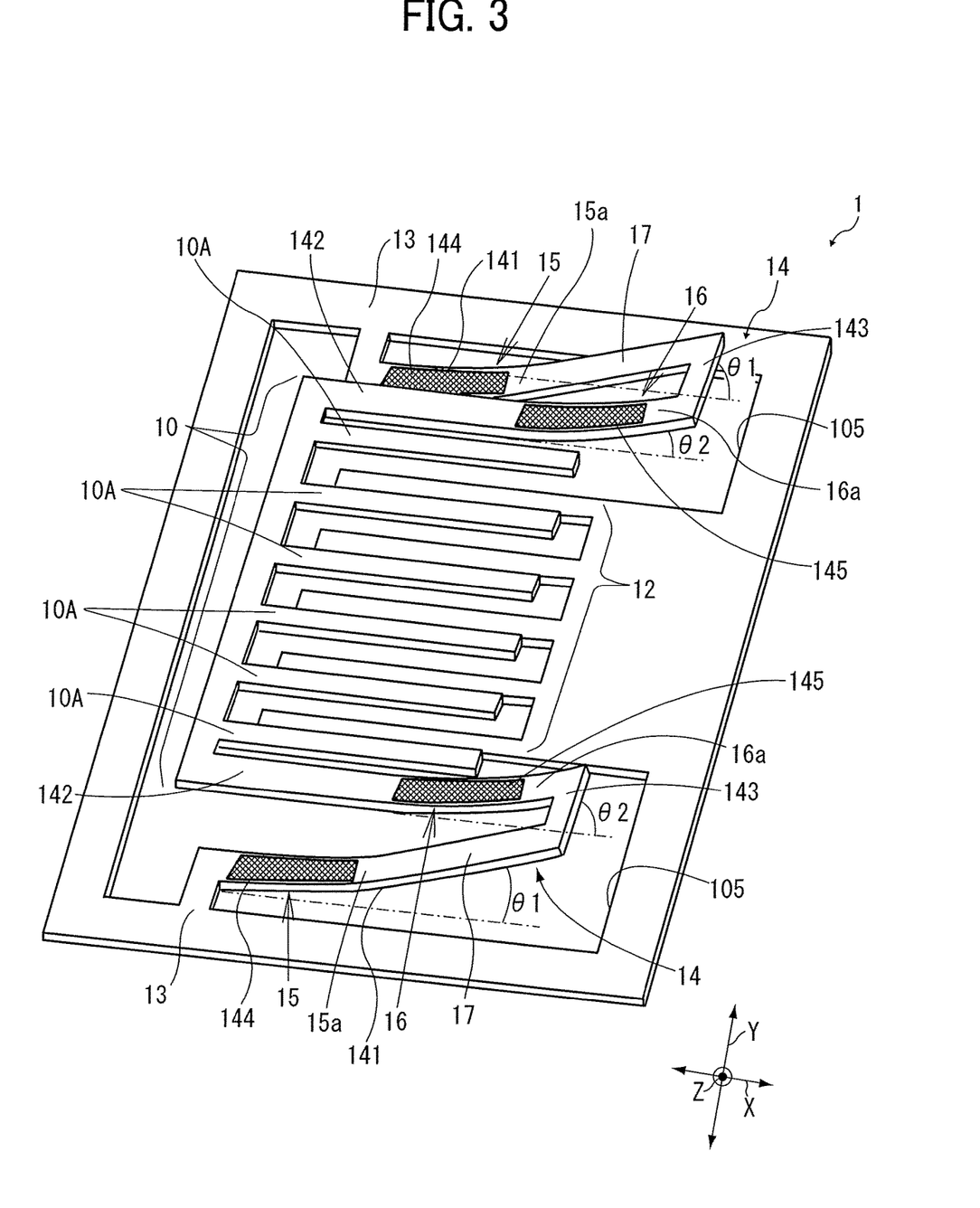
FIG. 3 is a diagram illustrating a state in which voltage is applied across a movable diffraction element, according to a first embodiment of the present disclosure.

FIG. 3 is a perspective view of the movable diffraction element 1 when voltages are applied to the movable diffraction element 1, according to the present embodiment.

Figure 4:
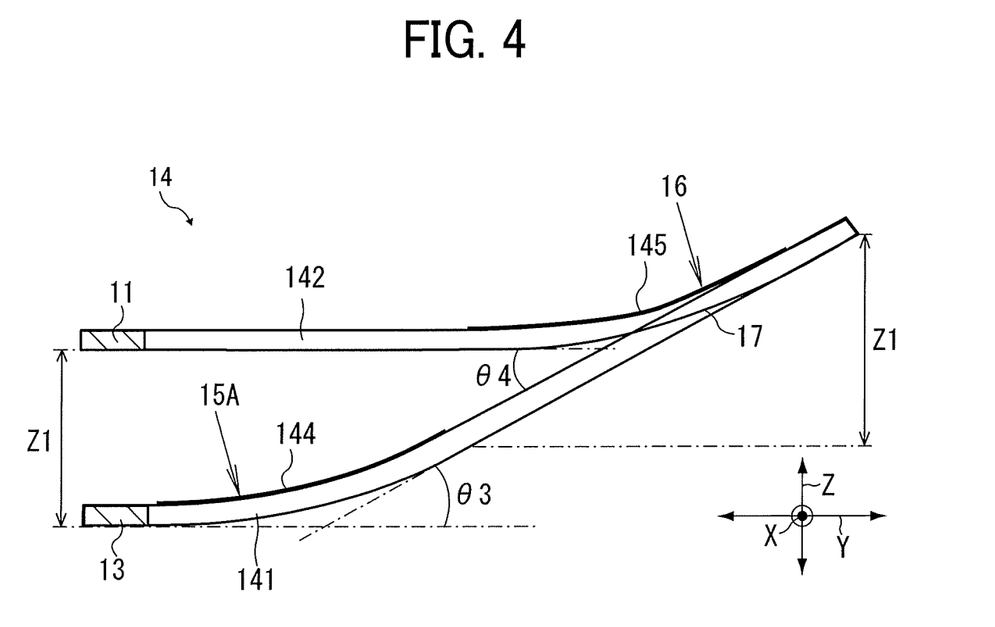
FIG. 4 is a diagram illustrating the slope of first and second cantilever actuators, according to an embodiment of the present disclosure.

FIG. 4 is a diagram illustrating a slope in the movable diffraction element 1, according to the present embodiment.

As illustrated in FIG. 1 and FIG. 2, the movable diffraction element 1 according to the present embodiment is a micro-electromechanical systems (MEMS) device provided with a movable component 10, a fixed component 12, a supporting unit 13 that supports the movable component 10, a pair of actuators 14 that joins the movable component 10 to the supporting unit 13. The movable component 10 is a comb-like movable component where a plurality of strip-shaped movable components 10A protrude from a coupling edge 11 in the longer-side direction X and the strip-shaped movable components 10A are arranged in parallel with each other in the shorter-side direction Y that intersects with the longer-side direction X on the same plane. The tip side of the movable component 10 can move in the direction intersecting with the longer-side direction and the shorter-side direction, where the coupling edge 11 serves as a fulcrum. Note that this intersecting direction herein will be referred to as the displacement direction Z in the present disclosure. In FIG. 2, the displacement direction Z is the vertical direction. The fixed component 12 is a comb-like component provided with a plurality of fixed components, and these fixed components are disposed between the teeth of the movable component 10.

The actuator 14 includes a linearly-shaped first arm 141 and a linearly-shaped second arm 142. The first arm 141 and the second arm 142 are formed so as to be parallel with each other. In the actuator 14, the first arm 141 and the second arm 142 are connected to each other at a coupler 143. The pair of first arms 141 are connected to the supporting unit 13, respectively, and formed as a single integrated unit. The pair of second arms 142 are connected to the both ends of the coupling edge 11 of the movable component 10 positioned in the shorter-side directions Y, respectively, and formed as a single integrated unit. Each of the pair of actuators 14 is provided with a driver, and functions to deform the first arm 141 and the second arm 142 separately.

As illustrated in FIG. 3, the first arm 141 according to the present embodiment is provided with a piezoelectric element 144 as a driver. Due to this configuration, the region at which the piezoelectric element 144 is disposed serves as a first cantilever actuator 15. In the following description, the first cantilever actuator 15 will be referred to as the first actuator 15. The pair of second arms 142 is provided with a piezoelectric element 145 as a driver. Due to this configuration, the region at which the piezoelectric element 145 is disposed serves as a second cantilever actuator 16. In the following description, the second cantilever actuator 16 will be referred to as the second actuator 16. As illustrated in FIG. 3, the piezoelectric element 144 is disposed on an edge of the first arm 141 on the supporting unit 13 side. The piezoelectric element 145 is disposed on the second arm 142 on the coupler 143 side. The piezoelectric element 144 and the piezoelectric element 145 are disposed on the first arm 141 and the second arm 142, respectively, in a shifted manner so as to be positioned on the other side of each other in the longer-side direction. In other words, each of the first actuator 15 and the second actuator 16 is a piezoelectric actuator provided with a piezoelectric element. A region of the first arm 141 placed between the first actuator 15 and the coupler 143 serves as a displacement determiner 17 that determines the displacement in the displacement direction Z. The second actuator 16 is arranged parallel to the first actuator 15, and is energized by the piezoelectric element 145. Due to this configuration, the second actuator 16 has the function of making an edge of the second arm 142 flat on the coupling edge 11 side.

The movable diffraction element 1 includes the movable component 10, the fixed component 12, the first actuator 15, and the second actuator 16A. Moreover, in the movable diffraction element 1, a through hole 105 is formed at an area opposite to the movable diffraction element, and the movable diffraction element 1 is configured to allow the displacement in the movable component 10, the first actuator 15, and the second actuator 16A (i.e., the displacement in the first arm 141 and the second arm 142). In the present embodiment, the displacement direction Z is in the up-and-down directions. For this reason, the through hole 105 is formed in the movable diffraction element 1. However, in view of cases in which the displacement direction Z is in the upper direction only, such a through hole may be omitted. FIG. 4 is a side view of the first actuator 15 and the second actuator 16 when voltages are applied to the piezoelectric element 144 and the piezoelectric element 145, according to an embodiment of the present disclosure. Due to the application of voltage, the piezoelectric element 144 and the piezoelectric element 145 contract, and bending occurs for the first actuator 15 and the second actuator 16. FIG. 4 illustrates a state in which the slopes that are caused by the those actuators are θ1 and θ2, respectively. Accordingly, the coupling edge 11 becomes horizontal when the relation "θ1=θ2" is maintained, and the movable component 10 that is connected to the coupling edge 11 can be maintained horizontal and displaced in the displacement direction Z. As illustrated in FIG. 4, the amount of displacement Z1 between the first actuator 15 and the second actuator 16 is indicated by (Displacement Determiner)×sin θ1. Given the above circumstances, the displacement determiner 17 is disposed at an edge portion of the first actuator 16.

As illustrated in the cross section of FIG. 2, the movable diffraction element 1 is configured in such a manner that a silicon supporting layer 101, an oxidized silicon layer 102, a silicon active layer 103, an insulating layer 110, and a protective layer 111 are laminated on the supporting unit 13. The movable component 10 and the fixed component 12 are configured by stacking a reflective layer 106 on the silicon active layer 103. In the first arm 141 of each of the actuators 14, the piezoelectric element 144 including a lower electrode 201, a piezoelectric layer 202, and an upper electrode 203 is laminated on the silicon active layer 103. On each of the upper electrodes 203, the insulating layer 110 and the protective layer 111 are laminated. Basically, the second arm 142 of the actuator 14 has a configuration equivalent to that of the first arm 141. The reference sign 105 indicates a through hole in FIG. 2. The actuator 14 is configured to be displaced in the displacement direction Z by the passage of electric current fed between the lower electrode 201 and the upper electrode 203. The laminated structure of the movable diffraction element 1 is merely an example, and no limitation is intended thereby.

As illustrated in FIG. 3 and FIG. 4, in the present embodiment, the movable component 10 is configured such that the slope θ2 of the second arm 142 that is caused by the second actuator 16A in the displacement direction Z and the slope θ1 of the first arm 141 that is caused by the first actuator 15 in the displacement direction Z become approximately equivalent to each other.

Currently, the movable diffraction element of the MEMS is actively applied to new use such as of optical switches and spectroscopes. In the movable diffraction element of the known MEMS, the amount of displacement in the height direction (i.e., the displacement direction) takes only two values. One value is taken when no driving force is applied to the movable component, and the other value is taken when driving force is applied to the movable component. However, multiple-value control where the movable component is stopped at any desired displacement level is also desired. In the movable diffraction element of two-value type, the flatness of the movable component is maintained by making the movable component touch the surface facing to the movable component when the driving force is applied. However, in a movable diffraction element of multiple-value type, depending on the displaced position, it is not possible to make the movable component contact a fixed component or the like facing to the movable component across its entire surface, and this may cause bending or inclination for the movable component. For this reason, the height may vary between both ends and near the center of the movable diffraction element, and the properties and characteristics of the exiting light does not become even. Accordingly, an error signal tends to be generated.

However, the movable diffraction element 1 according to the present embodiment is provided with the first actuator 15 and the displacement determiner 17 that determines the displacement in the displacement direction Z. Due to this configuration, the movable diffraction element 1 according to the present embodiment can cause the displacement in the displacement direction (i.e., the vertical direction) to the movable component 10. Moreover, the first actuator 15 and the second actuator 16 are arranged so as to be parallel with each other. Due to this configuration, the inclination at an edge 16a of the second actuator 16 in the shorter-side directions Y that is orthogonal to the first actuator 15 and the second actuator 16 can be prevented from occurring. Further, the slope θ1 that is caused by the first actuator 15 and the slope θ2 that is caused by the second actuator 16 are controlled to be approximately equivalent to each other. Due to this configuration, the inclination at the coupling edge 11 of the second actuator 16 (or the second arm 142) in the direction parallel to the first actuator 15 and the second actuator 16 (i.e., in the longer-side directions X) can be prevented from occurring. Due to those configurations as described above, the movable diffraction element 1 can be displaced in the displacement direction Z without causing much bending or inclination. Accordingly, the amount of error signal that is caused by the bending or inclination caused to the movable diffraction element 1 can be reduced.

In the present embodiment, the piezoelectric element 144 and the piezoelectric element 145 are used as the drivers of the first arm 141 and the second arm 142, respectively, to implement the first actuator 15 and the second actuator 16. In this configuration, the slope θ1 and the slope θ2 that are caused by the first actuator 15 and the second actuator 16, respectively, in the displacement direction Z are determined by the sizes of the piezoelectric element 144 and the piezoelectric element 145, the sizes and materials of the rigid frame, and the constraints on those sizes of the piezoelectric element 144 and the piezoelectric element 145 and those sizes and materials of the rigid frame. When the sizes and the materials of the rigid frame are predetermined and it is difficult to make the constraints on the piezoelectric element 144 and the piezoelectric element 145 of the first actuator 15 and the second actuator 16 equivalent to each other, the size of each of the piezoelectric element 144 and the piezoelectric element 145 may be adjusted to control the inclination of the movable component 10 in the longer-side direction. When it is possible to make the constraints on the piezoelectric element 144 and the piezoelectric element 145 equivalent to each other, the sizes of the piezoelectric element 144 and the piezoelectric element 145 may be made equivalent to each other to control the inclination of the movable component 10 in the longer-side direction. In view of the simplicity of the processes, as in the latter case, it is desired that the sizes and the constraints on the piezoelectric element 144 and the piezoelectric element 145 be equivalent to each other.

Second Embodiment

Next, a second embodiment of the present disclosure is described with reference to FIG. 5 and FIG. 6.

Figure 5:
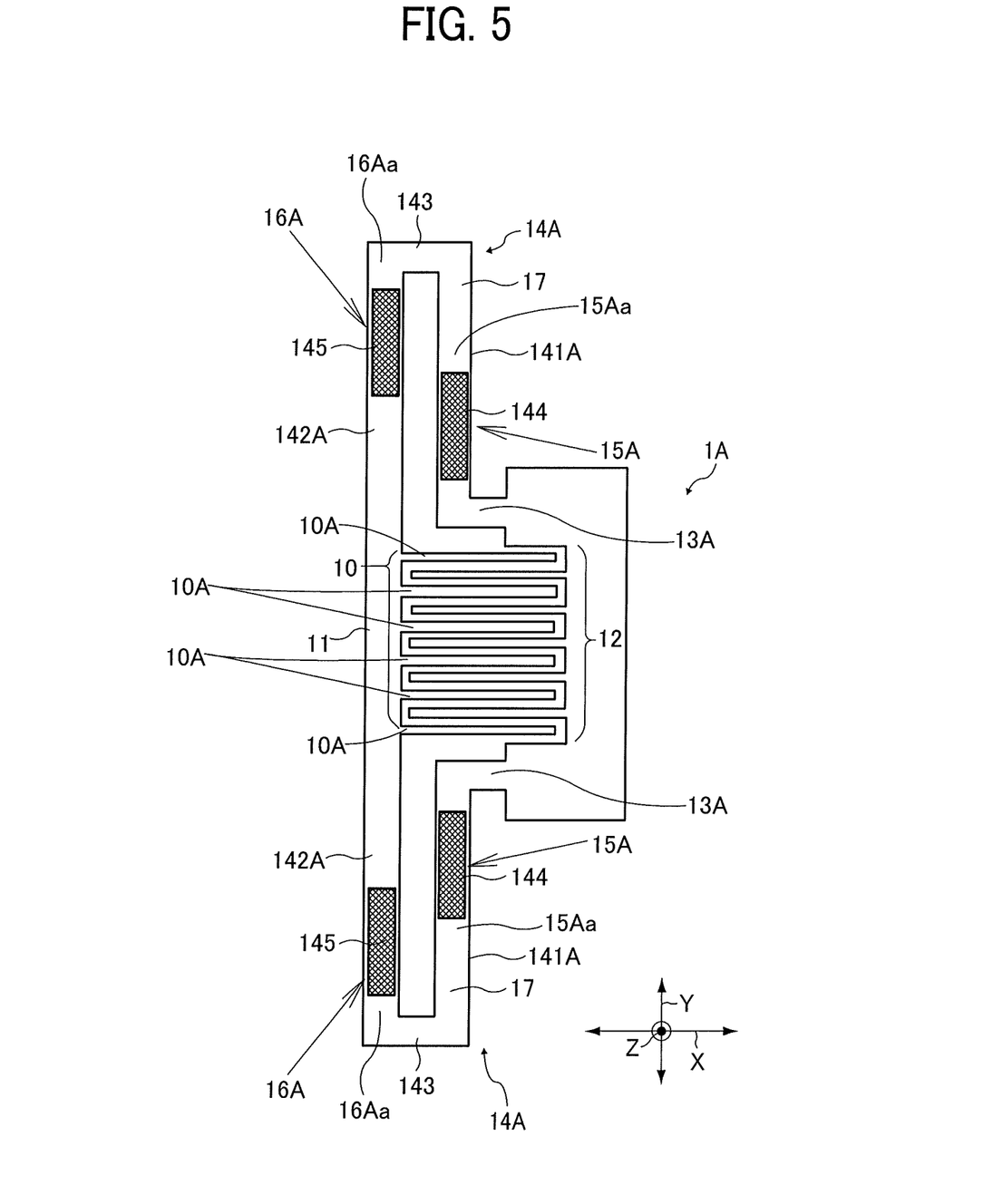
FIG. 5 is a diagram illustrating a configuration of a movable diffraction element according to a second embodiment of the present disclosure is described.

FIG. 5 is a top view of a configuration of a movable diffraction element 1A according to the second embodiment.

Figure 6:
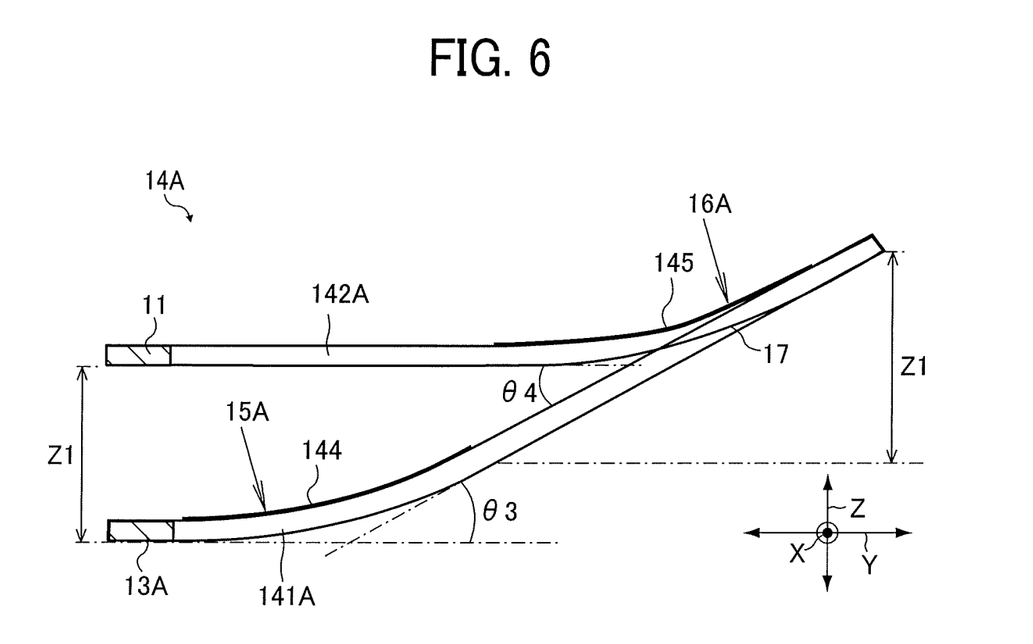
FIG. 6 is a diagram illustrating the slope of the first and second cantilever actuators of a movable diffraction element, according to a second embodiment of the present disclosure.

FIG. 6 is a diagram illustrating a slope in the movable diffraction element 1A, according to the present embodiment.

The movable diffraction element 1A according to the second embodiment includes a comb-like movable component 10A, a comb-like fixed component 12A arranged between the teeth of the comb-like movable component 10A, a pair of supporting units 13A that support the movable component 10 from both sides in the shorter-side direction, and a pair of actuators 14A that are arranged between the movable component 10A and the pair of supporting units 13A. Each of the actuators 14A includes a linearly-shaped first arm 141A and a linearly-shaped second arm 142A that are arranged so as to be parallel with each other, and a coupler 143A that connects between the first arm 141A and the second arm 142A. Moreover, the first arm 141A and the second arm 142A are provided with the piezoelectric element 144 and the piezoelectric element 145, respectively, and each of the piezoelectric element 144 and the piezoelectric element 145 serves as a driver. Due to this configuration, a first cantilever actuator 15A and a second cantilever actuator 16A are implemented. Further, a displacement determiner 17A that determines the displacement in the displacement direction Z is disposed between an edge 15Aa of the first actuator 15 and the coupler 143A (or between the piezoelectric element 144 and the coupler 143A).

In the present embodiment, in a similar manner to the first embodiment as illustrated in FIG. 5, the movable component 10A is configured such that, as illustrated in FIG. 6, the slope θ4 of the second actuator 16A that is caused by the second actuator 16A in the displacement direction Z is configured so as to be approximately equivalent to the slope θ3 that is caused by the first actuator 15A in the displacement direction Z. Moreover, the movable diffraction element 1A is arranged such that each of the first actuator 15A and the second actuator 16A extends in the shorter-side direction Y of the movable component 10A that is orthogonal to the longer-side direction X on the same plane and the first actuator 15A and the second actuator 16A are parallel to each other. In this respect, the movable diffraction element 1A according to the second embodiment is different from the movable diffraction element 1 according to the first embodiment. In other words, in the first embodiment, the actuators extend in the direction intersecting with the coupling edge 11 that extends in the shorter-side direction. By contrast, in the second embodiment, the actuators extend in the same direction as the direction in which the coupling edge 11 extends in the shorter-side direction.

In the present embodiment, the first actuator 15A and the second actuator 16A are arranged in the direction Y that is orthogonal to the longer-side direction X of the movable component 10A. Accordingly, the inclination of the movable component 10 in the longer-side direction can be prevented from occurring. Moreover, the inclination of the edge 15Aa that is caused by the deformation of the first actuator 15A is brought back to a horizontal position by the second actuator 16A. Due to this configuration, the bending of the movable component 10A that occurs to the coupling edge 11 of the teeth of the movable component 10A in the shorter-side direction can be controlled. Due to those configurations as described above, the movable diffraction element 1A can be displaced in the displacement direction Z without causing much bending or inclination. Accordingly, the amount of error signal that is caused by the bending or inclination caused to the movable diffraction element 1A can be reduced.

Third Embodiment

Next, a third embodiment of the present disclosure is described with reference to FIG. 7 and FIG. 8.

Figure 7:
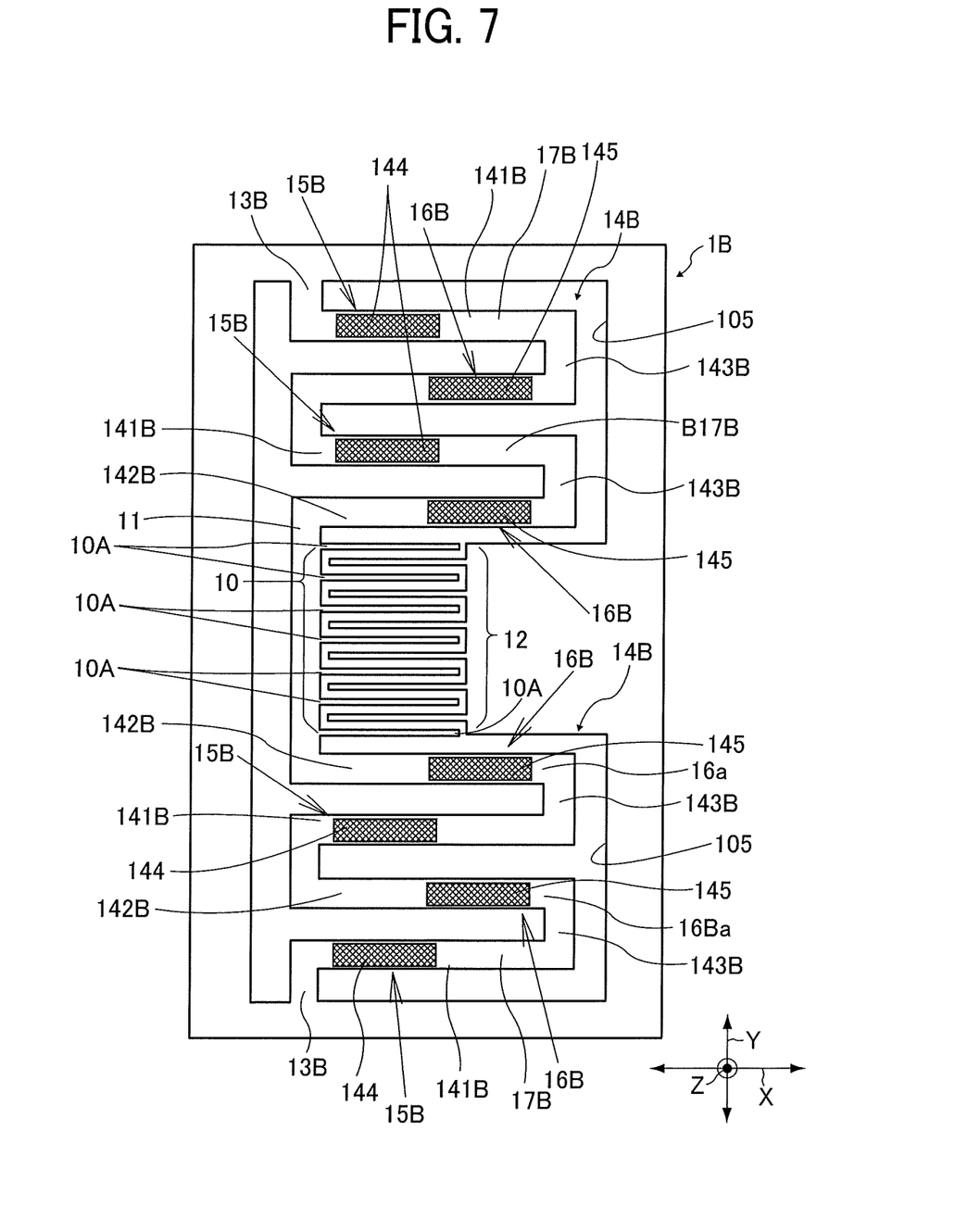
FIG. 7 is a diagram illustrating a configuration of a movable diffraction element according to a second embodiment of the present disclosure is described.

FIG. 7 is a top view of a configuration of a movable diffraction element 1B according to the third embodiment.

Figure 8:
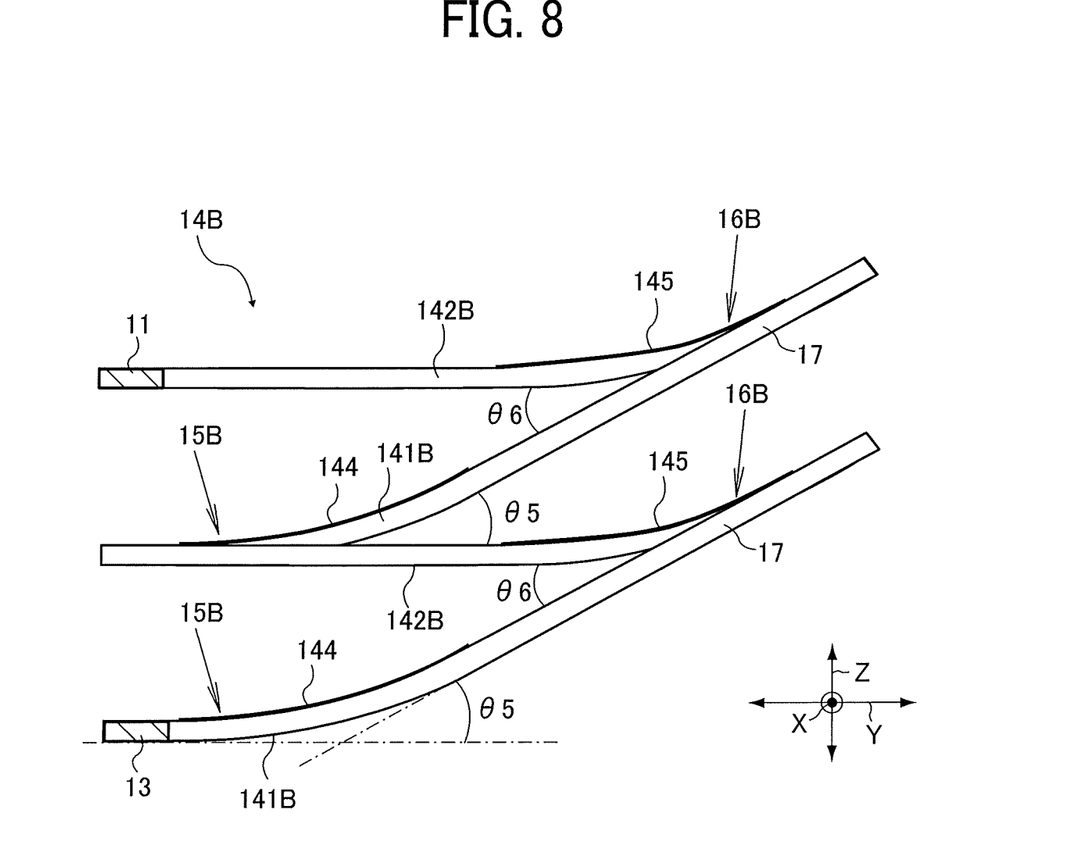
FIG. 8 is a diagram illustrating the slope of the first and second cantilever actuators of a movable diffraction element, according to a third embodiment of the present disclosure.

FIG. 8 is a diagram illustrating a slope in the movable diffraction element 1B, according to the present embodiment.

The movable diffraction element 1B according to the third embodiment includes the comb-like movable component 10, the comb-like fixed component 12 arranged between the teeth of the comb-like movable component 10, a pair of supporting units 13B that support the movable component 10 from both sides in the shorter-side direction, and a pair of actuators 14B that are arranged between the movable component 10 and the pair of supporting units 13B. Each of the actuators 14B according to the present embodiment includes a first arm 141B and a second arm 142B that are arranged so as to be parallel with each other, and a coupler 143B that connects between the first arm 141B and the second arm 142B. Moreover, the first arm 141B and the second arm 142B are provided with the piezoelectric element 144 and the piezoelectric element 145, respectively, and each of the piezoelectric element 144 and the piezoelectric element 145 serves as a driver. Due to this configuration, a first cantilever actuator 15B and a second cantilever actuator 16B are implemented. Further, a displacement determiner 17B that determines the displacement in the displacement direction Z is disposed between an edge 15Ba of the first actuator 15B and the coupler 143B (or between the piezoelectric element 144 and the coupler 143B). In the present embodiment, two pairs of first actuator 15B and two pairs of second actuator 16B are successively formed in multiple layers in the shorter-side direction. In other words, the first actuator 15B on one side includes two first arms 141B, and the second actuator 16BB on one side includes two second arms 142B. Accordingly, the movable diffraction element 1B includes four first arms and four second arms in total.

As illustrated in FIG. 8, in the movable diffraction element 1B, the slope θ6 that is caused by the second actuator 16B is approximately equivalent to the slope θ5 that is caused by the first actuator 15B, and a plurality of layers of the first actuator 15B and the second actuator 16B are formed in the shorter-side directions Y, so as to be parallel to the longer-side direction X of the movable component 10.

In the present embodiment, multiple first actuators 15B and multiple second actuator 16B are arranged in the shorter-side direction Y that is orthogonal to the longer-side direction X of the movable component 10. Due to this configuration, the bending of the movable component 10 in the shorter-side direction can be prevented from occurring. Moreover, the inclination of the edges 15Ba that is caused by the deformation of the first actuators 15B is brought back to a horizontal position by the neighboring ones of the respective second actuators 16B. Due to this configuration, the inclination of the movable component 10 that occurs to the coupling edge 11 of the teeth of the movable component 10 in the longer-side direction can be controlled. Due to those configurations as described above, the movable diffraction element 1B can be displaced in the displacement direction Z without causing much bending or inclination. Accordingly, the amount of error signal that is caused by the bending or inclination caused to the movable diffraction element 1B can be reduced.

Fourth Embodiment

Next, a fourth embodiment of the present disclosure is described with reference to FIG. 9. In the fourth embodiment, a spectroscope 300 is described that is provided with any desired one of the movable diffraction elements according to the embodiments described above.

Figure 9:
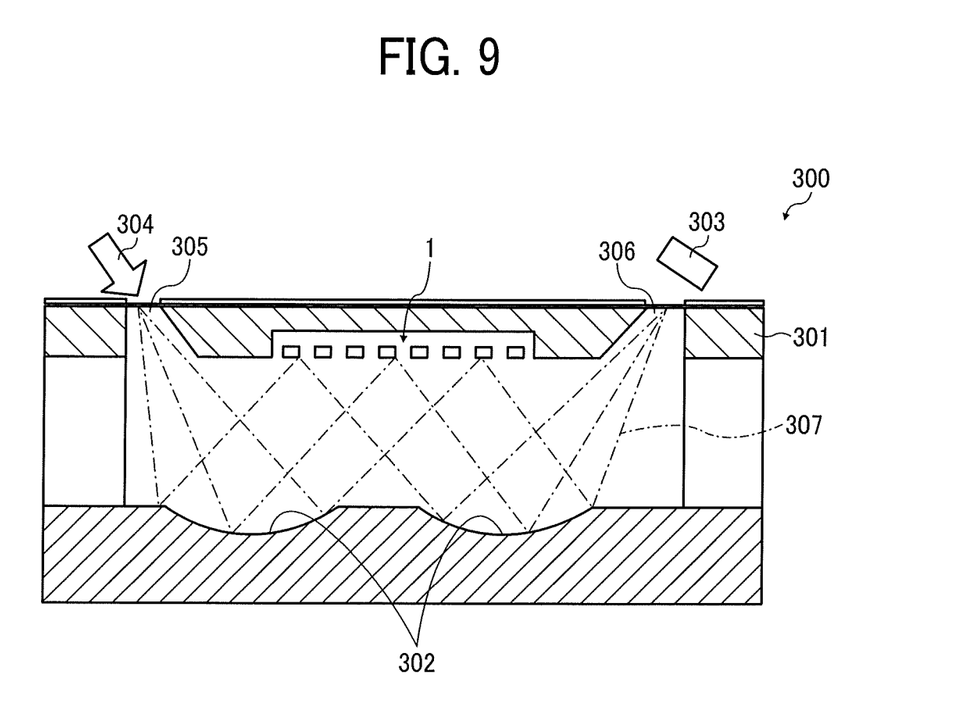
FIG. 9 is a diagram illustrating an example configuration of a spectroscope according to a fourth embodiment of the present disclosure.

FIG. 9 is a schematic diagram of the spectroscope 300 according to the present embodiment.

It is assumed that the movable diffraction element 1A according to the first embodiment as described above is used as a movable diffraction element of the present embodiment used for the spectroscope 300. However, the movable diffraction element 1A according to the second embodiment as described above or the movable diffraction element 1B according to the third embodiment as described above may also be adopted. The spectroscope 300 includes a substrate 301 on which the movable diffraction element 1 is mounted, a concave mirror 302 that is arranged opposite to the movable diffraction element 1, and a detector 303. On the substrate 301, a slit 305 that accepts incident light 304 therethrough and guides the accepted incident light 304 to the concave mirror 302, and a slit 306 that lets diffracted light 307 pass therethrough and guides the diffracted light 307 to the detector 303 are formed. In the spectroscope 300 of such a configuration as above, the incident light 304 having certain spectrum characteristics is incident on the movable diffraction element 1, and the diffracted light 307 excluding the zero-order diffracted light is received by the detector 303. More specifically, the diffracted light 307 is received by the detector 303 while offsetting the movable diffraction element 1. Due to this configuration, the spectrum characteristics of the incident light 304 can be calculated based on the relation between the offset amount of movable component and the light quantity of the diffracted light 307. Accordingly, the spectrum can be obtained by a single pixel sensor, and reduction in size and cost can be achieved compared with a spectroscope that adopts a known sensor array.

The present disclosure is not limited to the details of the example embodiments described above, and various modifications and improvements are possible. In the movable diffraction element 1B as illustrated in FIG. 7, multiple layers of the first actuator 15B and the second actuator 16B are disposed on both right and left sides of the movable component 10, respectively, so as to be parallel with the longer-side direction X of the movable component 10.

However, no limitation is intended thereby. For example, multiple layers of the first actuator 15A and the second actuator 16B of the movable diffraction element 1A, according to the second embodiment as described above with reference to FIG. 4, may be disposed in the longer-side direction X that is orthogonal to the shorter-side direction Y of the movable component 10A. Note also that the arrangement of the elements of the spectroscope 300 provided with the movable diffraction element 1, as illustrated in FIG. 8, is merely an example, and no limitation is intended by the configuration or arrangement of FIG. 8. In the embodiments as described above, each of the first actuator and the second actuator is described as a piezoelectric actuator that adopts a piezoelectric element as a driver. However, a thermal actuator that adopts a thermal element (heater element) as a driver may be used in place of the piezoelectric element. In the present embodiment, each of the displacement determiners 17, 17A, and 17B is linearly formed. However, no limitation is intended thereby, and each of the displacement determiners 17, 17A, and 17B may be formed in a different shape other than a linear shape.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A movable diffraction element comprising:
   a movable component that includes a plurality of strips formed in a comb-like shape, the movable component including a coupling edge connected to each of the plurality of strips;
   a fixed component including a plurality of projections respectively disposed between the plurality of strips of the movable component;
   a supporting unit configured to support the movable component; and
   a first actuator, the first actuator including:
      a first cantilever actuator coupled to the supporting unit, the first cantilever actuator including a first driver configured to deform the first cantilever actuator based on application of voltages to the first driver:
      a displacement determiner coupled to an edge of the first cantilever actuator; and
      a second cantilever actuator connected with the coupling edge and disposed parallel to the first cantilever actuator, the second cantilever actuator including a second driver configured to deform the second cantilever actuator based on application of voltages to the second driver,
   wherein the second cantilever actuator and the first cantilever actuator are configured to be deformed so that a slope of the second cantilever actuator is approximately equivalent to a slope of the first cantilever actuator, and
   wherein the plurality of strips of the movable component and the plurality of projections of the fixed component are configured by stacking a reflective layer on a silicon active layer, and
   wherein a direction in which the plurality of strips of the movable component extend and a direction in which the plurality of projections of the fixed component extend are opposed to each other.

2. The movable diffraction element according to claim 1, wherein the first cantilever actuator and the second cantilever actuator are disposed approximately parallel to a longer-side direction of the movable component.

3. The movable diffraction element according to claim 1, wherein the first cantilever actuator and the second cantilever actuator are disposed to intersect with a longer-side direction of the movable component.

4. The movable diffraction element according to claim 1, wherein a plurality of layers including each of the first cantilever actuator and the second cantilever actuator are disposed.

5. The movable diffraction element according to claim 1, wherein each of the first cantilever actuator and the second cantilever actuator is a piezoelectric actuator provided with a piezoelectric element.

6. The movable diffraction element according to claim 1, wherein each of the first cantilever actuator and the second cantilever actuator is a thermal actuator.

7. The movable diffraction element according to claim 1, further comprising a through hole extending through the movable diffraction element, the through hole being located at an area opposite to the movable component having a comb-like shape, the first cantilever actuator, and the second cantilever actuator.

8. A spectroscope comprising the movable diffraction element according to claim 1.

9. The movable diffraction element according to claim 1, further comprising:
   a second actuator, the second actuator including:
      a first cantilever actuator coupled to the supporting unit, the first cantilever actuator including a first driver configured to deform the first cantilever actuator based on application of voltages to the first driver;
      a displacement determiner coupled to an edge of the first cantilever actuator; and
      a second cantilever actuator connected with the coupling edge and disposed parallel to the first cantilever actuator, the second cantilever actuator including a second driver configured to deform the second cantilever actuator based on application of voltages to the second driver,
   wherein each of the first actuator and the second actuator includes a first cantilever arm and a second cantilever arm,
   wherein the first cantilever arm of the second actuator is coupled to the supporting unit,
   wherein the second cantilever arm of the second actuator is coupled to the coupling edge,
   wherein a longitudinal direction of the first cantilever arms of the first and second actuators and a longitudinal direction of the second cantilever arms of the first and second actuators are parallel to each other and extend in a first direction, and
   wherein a longitudinal direction of the plurality of strips extends in the first direction.

10. The movable diffraction element according to claim 9, wherein the supporting unit completely surrounds each of the movable component, the fixed component, the first cantilever arm, and the second cantilever arm as viewed in the deformation direction.

11. The movable diffraction element according to claim 1, wherein diffraction is performed by the movable component and the fixed component.

* * * * *